Dec. 26, 1967  G. L. MAIR  3,359,651
METHOD AND APPARATUS FOR TEACHING
Filed July 16, 1965  2 Sheets-Sheet 1
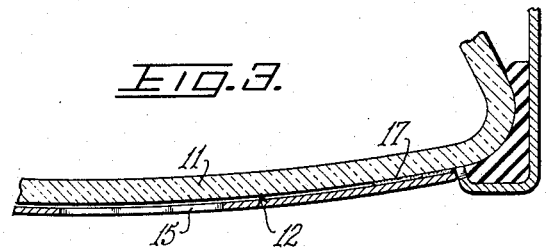
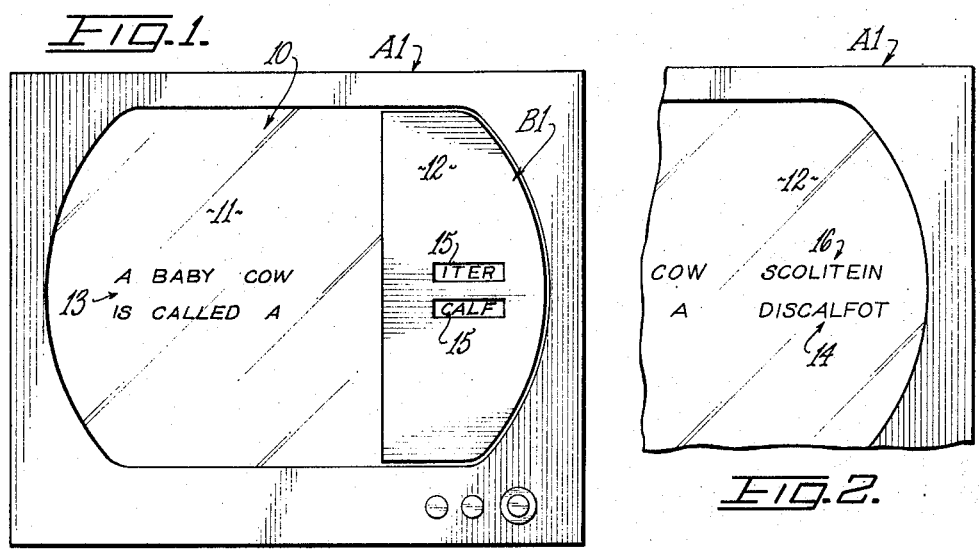
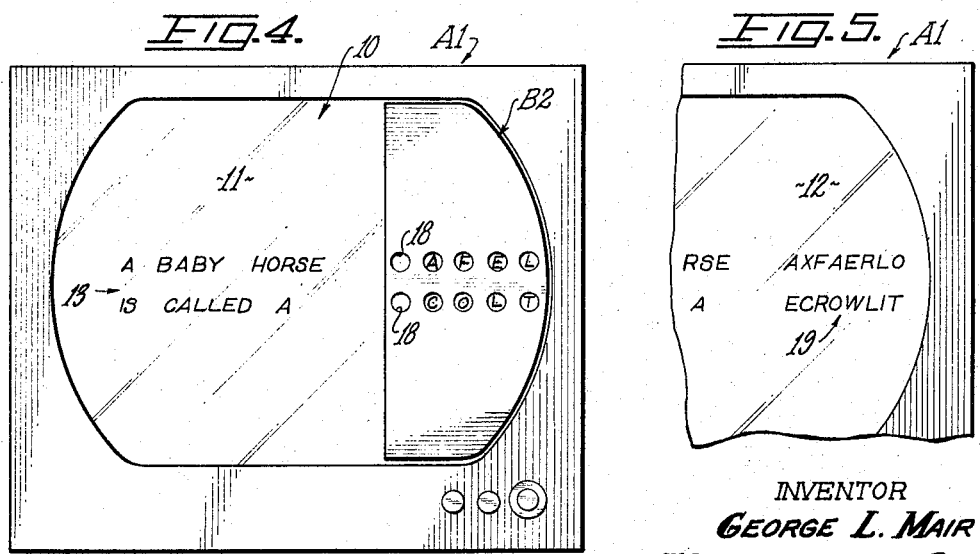
INVENTOR
GEORGE L. MAIR
BY
Lynn K Latta
ATTORNEY Dec. 26, 1967 G. L. MAIR 3,359,651
METHOD AND APPARATUS FOR TEACHING
Filed July 16, 1965 2 Sheets-Sheet 2
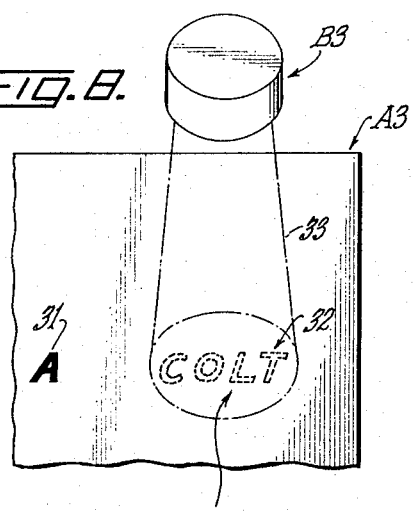
FIG. 8.
ULTRA-VIOLET SENSITIVE INK
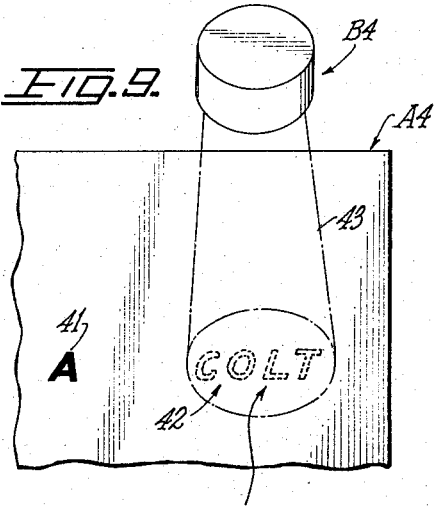
FIG. 9.
HEAT SENSITIVE INK
FIG. 10.
FIG. 7.
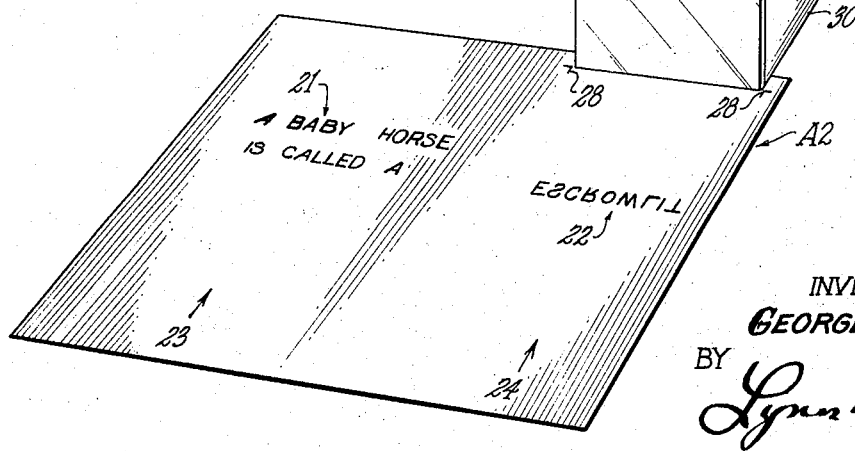
FIG. 6.
INVENTOR
GEORGE L. MAIR
BY Lynn H Latta
ATTORNEY

United States Patent Office 3,359,651
Patented Dec. 26, 1967

3,359,651
METHOD AND APPARATUS FOR TEACHING
George L. Mair, 6320 Van Nuys Blvd.,
Van Nuys, Calif. 91401
Filed July 16, 1965, Ser. No. 472,531
1 Claim. (Cl. 35—9)

ABSTRACT OF THE DISCLOSURE

Disclosed herein is a teaching apparatus comprising a display sheet having a question and a corresponding answer which is disguised by coding letters interspersed between the letters which spell out the answer. The answer is inverted so as to be read in a mirror which has non-reflecting surfaces adapted to register with the coding letters so that only the answer-spelling letters are visible in the mirror.

---

This invention relates to teaching apparatus of the type providing for presentation to a pupil of a series of questions followed by corresponding answers, currently referred to as a "teaching machine." The general object of the present invention is to provide an apparatus of this general class which is of relatively simple and inexpensive construction, adaptable for volume production and use. Toward the attainment of this general object, the invention aims to provide a teaching apparatus:

(1) Comprising a means for presenting a series of questions and answers in separate columns, together with a template or other device which can be manipulated to disclose the answers;

(2) Wherein the answers are coded or otherwise conditioned so as to be illegible except when properly exposed through sight openings in the template;

(3) Having an arrangement of answer-spelling letters commingled with coding characters rendering the answer unintelligible except when properly viewed with the assistance of a template or other uncoding device, and wherein the answer-spelling letters are spaced sufficiently adjacent one another to render the answer easily recognizable when viewed through the template;

(4) Having indicator means on a question and answer panel for notifying a reader when the template or other uncoding device is in the proper answer-reading position.

Other objects and advantages will become apparent in the ensuing specification and appended drawing in which:

FIG. 1 is a front elevational view of an apparatus embodying one form of the invention;

FIG. 2 is a front elevational view of a fragmentary portion of the question and answer presenting portion of the apparatus;

FIG. 3 is a fragmentary sectional view of the apparatus taken in the line 3—3 of FIG. 1;

FIG. 4 is a front elevational view of an apparatus embodying a modified form of the invention;

FIG. 5 is a fragmentary front view of the same with uncoding template removed;

FIG. 6 is a perspective view of an apparatus embodying another modified form of the apparatus;

FIG. 7 is a fragmentary sectional view of the template-mirror of FIG. 6;

FIG. 8 is a fragmentary schematic view of another modified form of the apparatus;

FIG. 9 is a fragmentary schematic view of another form of the apparatus; and

FIG. 10 is a semi-perspective, fragmentary view of an apparatus embodying still another form of the invention.

Referring now to the drawing in detail, my improved teaching apparatus comprises, in general, (A) a means for presenting a series of questions and answers, the questions being immediately legible as presented and the answers being coded or otherwise obscured so as to be unintelligible; together with (B) an uncoding device which can be utilized in connection with the question and answer presenting device so as to uncode the answer and render it intelligible; and (C) a suitable means which can be utilized by a student to record his answer to the question before uncoding the answer.

In the forms of the invention shown in FIGS. 1–4, the means for presenting the questions and coded answers comprises a television receiver A1 havng a screen 10 constituting the forward wall of a conventional television picture tube including a conventional cathode ray gun for projecting reproductions of successive paired questions and answers, the questions being reproduced in a leftward area 11 of the screen and the answers being reproduced in a rightward area 12 of the screen (FIG. 2). The answers may or may not be horizontally aligned with the questions. A question is indicated at 13 and a coded answer (FIG. 2) is indicated at 14. The answer comprises a series of adjacent letters a portion of which spell the answer to the question and the remainder of which are arranged to disguise or code the answer. In the practice of my improved method utilizing this apparatus, a single question and answer may be projected upon the screen, as shown in the drawing, or a plurality of questions and corresponding answers may be projected simultaneously. The answer may be a single line of letters or may be a plurality of lines of letters as indicated in FIG. 2, with only one of these lines containing the answer, the other line 16 of letters being utilized for further disguising the answer.

The uncoding device utilized in FIG. 1 is a template B1 having one or more windows 15 of horizontal slot form, adapted to reveal the answer in at least one of the windows by covering the coding letters of one line of letters 14. In the example given, the answer "calf" appears in the lower window of the template, the disguising letters of the coded answer "DISCALFOT" as projected on the screen, being covered by the template. Some of the letters of the line 16 of purely coding letters shown above the coded answer line 14 in FIG. 2, may also appear in an alternate window 15, so as to require more alertness on the part of the pupil in discovering the answer.

Further describing the method, the series of questions and answers will be projected for a sufficient length of time for the pupil to write his answer on a magic slate with a stylus, or on a pad of paper with a pencil, while viewing the screen 11 with the answer area 12 uncovered. The time alloted will be sufficient to enable the pupil to then cover the answer area 12 with the template B1 so as to identify the answer and to check his previously given answer as to correctness.

As shown in FIG. 3, the template B1 may be provided (e.g. along its rightward margin which is conformed to the rightward margin of the frame of screen 11) with a line or a series of spots of pressure-sensitive adhesives 17 which will adhere to the screen 11 sufficiently to hold the template in place after it has been fitted over the area 12 by the student. Alternatively, he can simply hold the template before the screen area 12 while viewing the answer.

In the form of the invention shown in FIGS. 4 and 5, the apparatus is the same as in FIGS. 1 and 2 with the exception that the template B2 is provided with a series of apertures 18 adapted to reveal alternate letters of a coded answer 19 in which alternate letters are coding letters and the intervening letters are the answer letters. The second, fourth, sixth and eighth letters of the coded answer 19 of FIG. 5 will spell the answer seen in FIG. 4.

Instead of the television screen A1, a projection screen, on which questions and answers are projected by a slide projector, can be utilized.

The question and answer, instead of being arranged in horizontal alignment as illustrated in the drawing, can be arranged one below the other and the template can be correspondingly designed to cover an upper or lower area of the screen instead of a side area. In order to adapt the apparatus to television screens of varying sizes, a series of templates with corresponding sizes can be prepared and the student can be furnished with a template of the proper size to fit his television set.

In the form of the invention shown in FIGS. 6, 7, the means for presenting the questions and answers comprises a simple flat sheet A which can be a page of a book or a binder or a pad or other group of question-answer sheets, one of which is indicated at A2. The question 21 and coded answer 22 are simply printed on the sheet, preferably in vertical columns with a series of questions 21 in a vertical column 23 and a series of answers 22 in a vertical column 24. The answer 22 is printed in an inverted form, and is coded by having therein alternate coding letters as in the answer 19 of FIG. 5. The answer is uncoded by reading it in a mirror-template B2 of transparent sheet material 25 such as glass or clear plastic, having a transparent reflective coating 26 thereon (FIG. 7) with a plurality of apertures 27 in the coating 26, arranged to provide a line of transparent windows spaced so as to register with the coding letters of answer 22, whereby the student may read the answers reflected in the mirror as indicated in FIG. 6 while the coding letters are not highly reflected and are thus rendered substantially invisible. The question-answer sheet A2 is provided with suitable locating marks 28 to which the lower corners of the mirror B2 can be fitted, and a suitable back support 30 may be provided to hold the mirror B2 in a vertical position or at a suitable angle so that a student seated directly in front of the sheet A2 will see the answer properly reflected in the mirror.

In the form of the invention shown in FIG. 8, the means for presenting the question and answer is a sheet A3 having the question 31 imprinted in ordinary printer's ink which is normally invisible. The uncoding device in this arrangement consists of an ultra-violet lamp B3 which is utilized to shine a beam of ultra-violet light 33 upon the answer 32 so as to render it visible.

The apparatus shown in FIG. 9 comprises a question-answer sheet A4 having the question 41 imprinted in ordinary printer's ink and the answer 42 imprinted in normally invisible heat-sensitive ink. The uncoding device B4 of this apparatus consists of an infra-red lamp which is used to shine a beam of infra-red rays 43 upon the answer 42 so as to render it visible.

The students' recording or scoring device C (FIG. 10) has a format embodying the following:
  A. A heading section at the top of the page containing:
    (1) A title such as "Quiz Identification Information" indicated at 51.
    (2) A student number space 52.
    (3) A space for the student's score, indicated at 53.
  B. A series of lines 54 separating the questions from one another vertically.
  C. Three columns, namely:
    (1) A wide question column 55 at the left side of the sheet;
    (2) A narrower intermediate column 56 for the student's answer;
    (3) A narrower column 57 for the correct answer and score; and
    (4) Vertical lines separating the columns.

The scoring sheet C can be used for recording answers to corresponding questions on problem presentation sheets such as sheets A2, A3 and A4, or may be utilized in a self-contained teaching apparatus wherein the pages are provided in duplicate, with both sheets being identical with the exception of the questions only being printed on the top sheet C and the questions and answers both being printed on the underneath or second sheet C1 in the columns 55 and 57 respectively. This apparatus can then be used with strips of approximately 3 inch carbon (indicated at 58 in FIG. 10); by assembling the pair of sheets and carbon strips into the assembly indicated at the bottom of FIG. 10 as follows:

(1) Underneath sheet C1 is folded along the column division line between columns 56 and 57, the rightward column being folded upwardly and over at 61; (2) then the strip of carbon paper 58 is inserted face downwardly beneath the folded answer column 61 and against the fold; (3) then the leftward portion of column 55 is folded at 63 over the folded margin 61; (4) then the column 57 of top sheet C is folded at 64 downwardly and beneath the rightward portion of the folded underneath sheet C1; and (5) finally the folded assembly of the two sheets is secured by staples (not shown) at the upper and lower extremities of the rightward portion of the folded assembly, the staples extending through the column 56 of sheet C, thence through the folded portion 63, 61, the carbon sheet 58, the body sheet C1 and finally through the bottom folded portion 64.

In the use of the folded assembly, the student writes his answer on the top sheet C in column 56 and it is transferred by the carbon onto the column 56 of the underneath sheet or second page C1. The second page now containing the student's answer (in carbon) in column 56 of the underneath or second page C1, as well as the correct answer, previously printed in column 57 of the sheet C1 is retained by the student, while the first page is handed in for grading.

The scoring sheets C can be used in conjunction with sheets C1 as described above, or can be used in connection with the other forms of apparatus described above, for scoring purposes.

I claim:

Teaching apparatus comprising, in combination: a question-answer display sheet having a question and a disguised answer imprinted thereon in associated relation, said answer being composed of answer-spelling letters and unintelligible coding letters intermingled therewith; and an uncoding device operable on said answer to render it legible, said answer being displayed with the letters thereof inverted, and said uncoding device comprising a mirror having a line of reflecting areas positioned for reflecting the letters of the answer back to an observer and having intervening non-reflecting areas for obscuring the coding letters of said answer.

References Cited

UNITED STATES PATENTS

| 1,405,193 | 1/1922 | Favreau | 35—9 |
| 1,736,552 | 11/1929 | Shulman | 35—9 |
| 2,330,718 | 9/1943 | Kallman | 283—8 |
| 3,048,697 | 8/1962 | Cavanaugh | 283—8 |
| 3,095,653 | 7/1963 | Corrigan | 35—9 |
| 3,248,050 | 4/1966 | Dickson | 235—89 |
| 3,251,141 | 5/1966 | MacRae | 35—9 |
| 3,281,960 | 11/1966 | Gross | 35—9 |
| 3,289,320 | 12/1966 | Mair | 35—9 |

FOREIGN PATENTS 632,463  12/1961  Canada.

EUGENE R. CAPOZIO, *Primary Examiner.*

W. W. NIELSEN, *Assistant Examiner.*